Patented Apr. 23, 1935

1,999,130

UNITED STATES PATENT OFFICE 1,999,130

TENNIS COURT

Ernest H. Nichols, Hagerstown, Md.

No Drawing. Application March 8, 1932,
Serial No. 597,635

2 Claims. (Cl. 94—7)

This invention relates to improvements in tennis-courts, walkways, play areas, bowling-greens, and the like, constructed principally of crushed mineral matter.

Such courts, as now built, have the advantages of not requiring frequent rolling and redressing, but they nevertheless have the disadvantage of coarser particles working up through the surface, which causes insecure footing to the player, and interferes with the proper bouncing of the tennis balls thereon. Furthermore, such courts lack permanence and uniformity in the color, and also reflect an annoying glare into the eyes of the players. Also, the surface of the courts, above-mentioned, do not have the desired resiliency, thereby rendering them injurious to the players' feet.

The principal object of the present invention is to provide a court, walkway, or the like, which overcomes the disadvantages above-mentioned, and, at the same time, has a low maintenance cost, as well as a fast-drying quality.

The defects in tennis courts and similar surfaces that have been constructed in the past, have resulted from the fact that the importance of selecting particles of the crushed mineral of the proper sizes, and using the proper proportions of such selected sizes, has been entirely ignored. It has been discovered that when certain sizes of the crushed mineral are selected and grouped together in the proper proportions, and when certain portions of the groups are utilized, also when care is exercised as to the color and chemical content of the mineral employed, a surface will be produced in which the coarser particles will not work to the surface, which will dry quickly after a rain, which will be sufficiently resilient, and which will possess a non-glaring and permanently colored surface.

The mineral which is employed in the present invention is used in its natural state, as removed from the quarry, and consists of quartzite-schistose greenstone, which is generally known as greenstone, because of its bright and unfading green color. Furthermore, this mineral has a chemical content which is also very desirable for the present purpose. This material is that described in the Geological Atlas of the United States under the Fairfield-Gettysburg Folio for Pennsylvania (folio 225), by Geo. W. Stone and F. Bascom, published by the United States Geological Survey, in 1929. (See page 5 of that folio.) As there shown, this rock may be found at Gladhill, Pennsylvania. (See the first map in said folio.)

This stone mineral contains silica, iron, alumina, calcium oxide, magnesium oxide, sulphur trioxide, potash, and carbon dioxide, in the following percentages: silica, 33.84%, iron and alumina (in the form of oxides), 39.50%, calcium oxide, 9.39%, magnesium oxide, 11.16%, sulphur trioxide, .034%, potash, .67%, carbon dioxide, 5.40%.

In carrying out the present invention the quartzite-schistose is subjected to a crushing treatment which breaks it into particles of various comparatively small sizes. It is then dried and screened with the use of screens of certain different mesh, and next divided into three groups or batches, certain portions of which are used in constructing a tennis court surface. The batches, which consist of particles of certain selected sizes will be designated herein as No. 1, No. 2, and No. 3, respectively, and will be made up according to the following screen specifications.

|  | No. 1 | No. 2 | No. 3 |
|---|---|---|---|
| Retained on 10 mesh | 0.00 |  |  |
| Retained on 14 mesh | 34.00 |  |  |
| Retained on 20 mesh | 39.00 | 0.00 |  |
| Retained on 28 mesh | 17.00 | 7.00 | 0.00 |
| Retained on 35 mesh | 8.50 | 39.50 | 1.00 |
| Passing 35 mesh | 1.50 |  |  |
| Retained on 65 mesh |  | 44.00 | 10.00 |
| Retained on 100 mesh | 9.00 | 9.00 | 10.00 |
| Passing 100 mesh |  | .50 |  |
| Retained on 150 mesh |  |  | 14.00 |
| Retained on 200 mesh |  |  | 13.00 |
| Passing 200 mesh |  |  | 31.00 |

With the crushed mineral there is mixed a gypsum binder having a chemical content of: silicon dioxide, .6%; aluminum oxide, .6%; ferric oxide, .3%; calcium carbonate, 4.0%; magnesium carbonate, 2.5%; combined water, 5.5%; and calcium sulphate, 86.5%. In other words, the material here mentioned is the usual commercial calcium sulphate commonly called plaster of Paris. This gypsum is rendered fine enough to pass a 200 mesh screen.

When constructing a surface, the ingredients are used in the following proportions: forty (40) pounds of the No. 1 batch, forty (40) pounds of the No. 2 batch, twenty (20) pounds of the No. 3 batch, and thirteen (13) pounds of the gypsum. These ingredients are then thoroughly mixed, when dry, in a suitable mixer, to effectively incorporate the particles with the gypsum binder, and with each other.

It has been found that the above given proportions of the batches produce the best results, I wish it understood that these proportions may be changed slightly to vary the resiliency of the surfacing.

The gypsum binder is used as a temporary binding medium, to permit the inherent qualities of the greenstone, with particular regard to its chemical and screening structure, to produce the desired and required compactness and resiliency in the court.

In the operation of making a tennis court, a hard cinder base is formed, and then the surface composition, as above described, is laid on the cinder base, to a depth of approximately one inch, after which the same is lightly sprinkled with water, to simulate rain, and then compactly rolled with a roller of about six hundred (600) pounds weight. After brushing this surface several times, followed by rerolling, the court is ready for use. This court, after having been laid, will require no redressing, and comparatively little rolling.

Furthermore, a court of this character will be dustless, and, at the same time, sufficiently porous to permit quick drainage, and immediate play thereon, thereafter.

The surface of the court will be yielding, under the feet of the players, and all danger of large pieces of stone working to the top completely obviated, thereby insuring the sure-footedness of the players, and permitting the proper and effective bouncing action of the tennis balls.

The color of the court will be pleasing to the eye, and such color unaffected by the elements. Also, there will be no apparent reflective qualities to the court, thereby protecting the eyes of the players. Furthermore, the texture of the court, resulting from the particular chemical and screen construction thereof, insures against looseness or ravelling of its surface.

What is claimed is:

1. The method of producing a surfacing for tennis courts, or the like, from quartzite-schistose greenstone in its natural state, consisting of crushing the quartzite-schistose greenstone, screening the same successively with screens of different mesh, segregating certain portions of the different screenings in three batches, selecting an equal amount from each of two of the batches and half that amount from the remaining batch, and mixing the selected material with a gypsum binder.

2. A method of producing a surfacing for tennis courts or the like from quartzite-schistose greenstone in its natural state consisting of crushing the quartzite-schistose greenstone, drying the same, selecting 40% of the crushed material passing a 10 mesh screen, 40% passing a 20 mesh screen, and 20% passing a 28 mesh screen, and mixing the selected material with a gypsum binder.

ERNEST H. NICHOLS.